US011100087B2

(12) United States Patent
Gupta et al.

(10) Patent No.: US 11,100,087 B2
(45) Date of Patent: Aug. 24, 2021

(54) DATA TOKENIZATION SYSTEM MAINTAINING DATA INTEGRITY

(71) Applicant: Microsoft Technology Licensing, LLC, Redmond, WA (US)

(72) Inventors: Shalini Gupta, Redmond, WA (US); Dharmesh Kumar, Redmond, WA (US); Elke Bregler, Redmond, WA (US); Rick Foucht, Redmond, WA (US); Navneet Saraogi, Redmond, WA (US); Frederic Huet, Redmond, WA (US); Ralph Yost, Redmond, WA (US); Gangaram Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 16/396,144

(22) Filed: Apr. 26, 2019

(65) Prior Publication Data
US 2020/0341965 A1  Oct. 29, 2020

(51) Int. Cl.
*G06F 16/23* (2019.01)
*G06F 16/25* (2019.01)
*G06F 16/22* (2019.01)

(52) U.S. Cl.
CPC ...... *G06F 16/2365* (2019.01); *G06F 16/2282* (2019.01); *G06F 16/2379* (2019.01); *G06F 16/258* (2019.01)

(58) Field of Classification Search
CPC ............. G06F 16/2365; G06F 16/2282; G06F 16/258; G06F 16/2379
USPC .................................................. 707/714, 718
See application file for complete search history.

(56) References Cited

U.S. PATENT DOCUMENTS

| 2006/0222163 | A1* | 10/2006 | Bank ..................... G06F 16/275 379/221.08 |
| 2010/0042583 | A1 | 2/2010 | Gervais et al. |
| 2010/0205189 | A1 | 8/2010 | Ebrahimi et al. |
| 2012/0030172 | A1* | 2/2012 | Pareek .................. G06F 16/275 707/635 |
| 2012/0066263 | A1* | 3/2012 | Wildermuth .......... G06F 16/254 707/792 |

(Continued)

OTHER PUBLICATIONS

"Barracuda Email Security Gateway", Retrieved from: https://www.barracuda.com/products/emailsecuritygateway, Retrieved Date: Apr. 4, 2019, 2 Pages.

(Continued)

*Primary Examiner* — James Trujillo
*Assistant Examiner* — Fariborz Khoshnoodi
(74) *Attorney, Agent, or Firm* — Schwegman Lundberg & Woessner, P.A.

(57) ABSTRACT

A system to tokenize values may include a processing unit; a storage device comprising instructions, which when executed by the processing unit, configure the processing unit to: receive a data item with an original value from a first storage system; store the data item in a staging table; transform the original value of the data item in the staging table to a changed value based on a stored rule; store a mapping between the original value and the changed value in a library table; and transmit the library table to a second storage system configured to update a database table at the second storage system based on the library table.

20 Claims, 4 Drawing Sheets

(56) References Cited

U.S. PATENT DOCUMENTS

| | | | |
|---|---|---|---|
| 2012/0221536 A1* | 8/2012 | Chen | G06F 16/275 |
| | | | 707/702 |
| 2012/0239540 A1 | 9/2012 | Rogers et al. | |
| 2012/0259877 A1 | 10/2012 | Raghunathan et al. | |
| 2014/0304275 A1* | 10/2014 | Baskett | G06F 16/2255 |
| | | | 707/747 |
| 2015/0051085 A1* | 2/2015 | Vogelstein | C12Q 1/6869 |
| | | | 506/2 |
| 2015/0089574 A1* | 3/2015 | Mattsson | G06F 21/6254 |
| | | | 726/1 |
| 2017/0161291 A1* | 6/2017 | Specht | G06F 16/258 |
| 2018/0276393 A1 | 9/2018 | Allen et al. | |
| 2019/0347342 A1* | 11/2019 | Kameswaran | G06F 16/254 |

OTHER PUBLICATIONS

"Cloud Data Loss Prevention", Retrieved from: https://cloud.google.com/dlp/, Retrieved Date: Apr. 4, 2019, 7 Pages.

"Keep an Eye on your Data using OpenDLP", Retrieved from: https://blog.rootshell.be/2010/04/30/keep-an-eye-on-your-data-using-opendlp/, Apr. 30, 2010, 15 Pages.

"International Search Report & Written Opinion Issued in PCT Application No. PCT/US2018/022767", dated Jun. 8, 2018, 11 Pages.

* cited by examiner

DATA TOKENIZATION SYSTEM MAINTAINING DATA INTEGRITY

BACKGROUND

Companies often utilize a production system and a non-production system. Testing may be performed on the non-production system to prevent downtime should an error occur during testing. The non-production systems may be used by internal or external developers and may have less security relative to the production system. As such, the non-production system may not use data from the production system, which may include personal identifiable information of users of the company. Additionally, some privacy regulations may restrict developers access to the production data. To alleviate some of the problems above, some companies use tokenization services to populate the non-production systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of succinctness, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

Increasingly, there is more reliance on personally identifiable information (PII) to perform tasks related to predictive analysis. Additionally, there may be several discrete, but interconnected, systems each with their own data stores. For example, a first system may perform customer relationship management, another system may govern and manage master data, another system may perform transactions, another system may validate transactions for trade compliance, and lastly one system may perform the business intelligence activities. Accordingly, almost any small or large level enterprise relies on more than one system. Additionally, the data for each system may have complex data structures used to manage activities like change management, different level of normalization, and audit needs of keeping local copies of data for each transaction.

The use of multiple system means that data is not only scattered within a single system, but may be scattered across multiple system. In order to successfully test a business process, all of the data across all of the system should align with each other within the system, as well as outside the system. For example, a user may have an account number. One system may be the source of truth for the account numbers, but many systems may use it. Thus, if the account number is tokenized (e.g., transformed from one form to another) in one system to one value but tokenized to another number in another system testing may not be performed successfully.

Users increasingly want to know what type of data companies store about them, and what do companies do with that data. Users often like to share data for a specific purpose like performing a business transaction and may not be satisfied if they learn that their data is being used for testing the business process. On the other side, IT workers in companies are moving to agile design which means faster designs, builds and tests. Having a system that is a production copy helps a company test better and move the code forward quicker.

Thus, the users and IT workers have competing needs. IT workers want realistic data and the users may want to remove their data from non-production systems. To satisfy both groups, there exists a need to convert real data into real looking, but non user-identifiable, data. Real looking data would mean an address should be formatted as a valid address, or a bank account number should follow the rules for a bank account number for the respective bank, or a name should be replaced by another name not just random characters, in various examples.

Existing tokenization services may transform one value (e.g., from an entry in a database) into another value (e.g., the token). For example, if a production system has a database entry of Amy, the tokenization service may generate a token of Roberto. Generally, the tokenization services have no knowledge of the use of the tokens or memory of what was tokenized before. Accordingly, if a tokenization service as described above is used, the privacy concerns of the users may be met, but the IT workers' needs may not. For example, the same input value may not result in the same output value—making it impractical (if not impossible) to test new processes on non-production systems.

In view of the above challenges, a new system is described that provides a number of advantages over existing tokenization services. For example, the system is scalable so that it can use the power of multiple processers to handle large volumes of data. The system may be centrally managed to ensure data consistency across the various non-production system. The system may be offered as a service to allow multiple companies to transform their production data to non-production systems. Additionally, the system may be flexible so that new tables or fields may be added/removed based on a company's needs. The system may also be fully automated as part of other processes.

The centralized tokenization system herein may be described as having three stages: (1) extracting data for obfuscation; (2) tokenizing the data and storing the results in a library table that maps an original value to its obfuscated counterpart; and (3) distributing the obfuscated data (e.g., the library table) for consumption by non-production systems. Each of these stages is discussed in more detail below.

The stages may be implemented on separate computing systems (either physically or virtually). As described in more detail in regards to FIG. 2, the separation of the computing systems allows the tokenizing system to remain small (from a resources perspective) and the more processing intensive task of parallelization to be managed by the non-production systems. Additionally, by transmitting the library table to the non-production system—instead of multiple commands to obfuscate the data to the non-production system—the speed of the updates is greatly increased because the distance between the tokenization system and non-production system may be thousands of miles.

Figure 1:
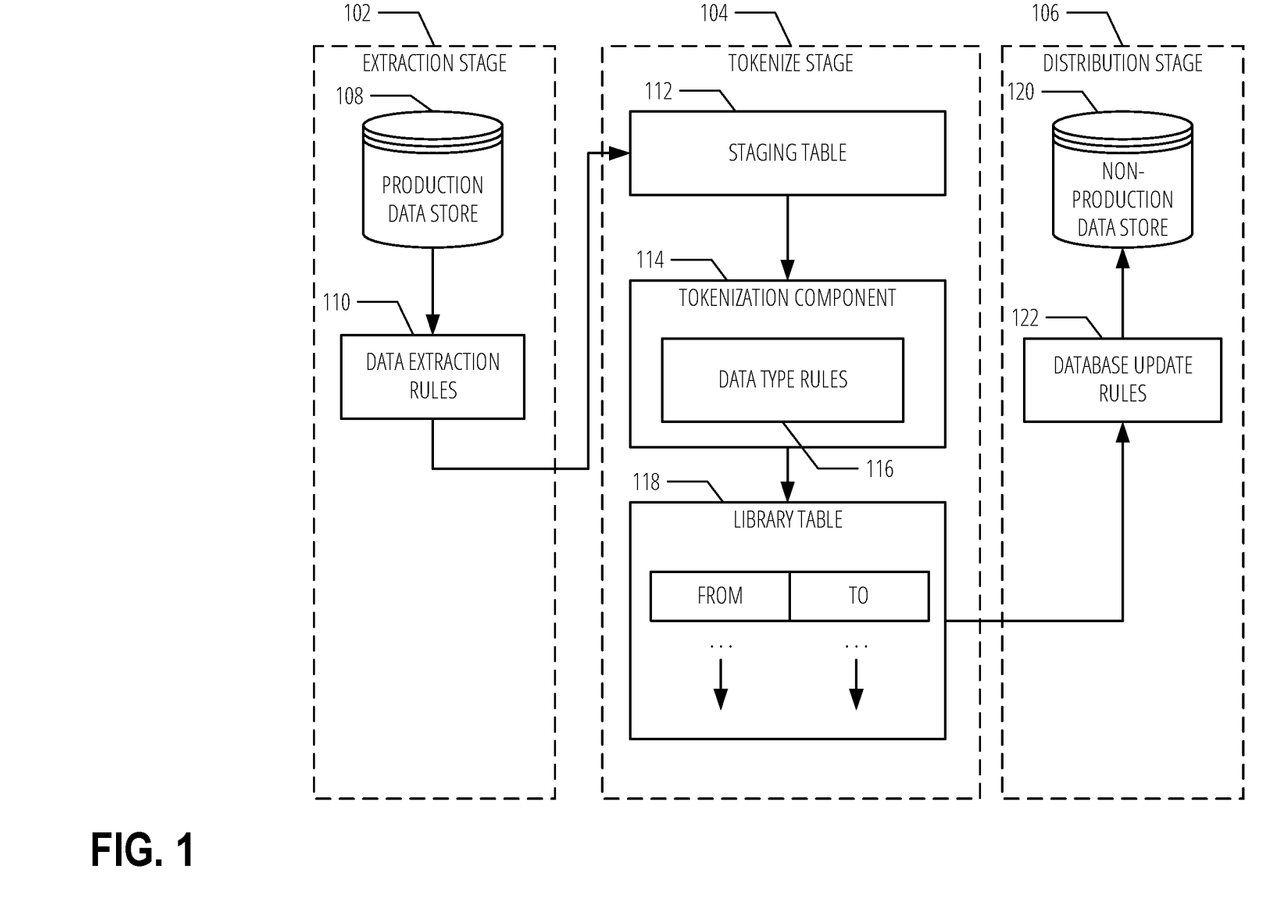
FIG. 1 is a diagram illustrating stages of a process to randomize data, according to various examples.

FIG. 1 is a diagram illustrating stages of a process to randomize data, according to various examples. FIG. 1 includes extraction stage 102, tokenize stage 104, and distribution stage 106. Extraction stage 102 includes production data store 108 and data extraction rules 110 in various examples. Tokenize stage 104 includes staging table 112, tokenization component 114, data type rules 116, and library table 118. Distribution stage 106 includes non-production data store 120 and database update rules 122.

The three stages in FIG. 1 may be implemented on a single computing system or may be implemented on multiple computing systems. Herein, data is described as being sent to/received from the three different illustrated stages, but as one of ordinary skill would understand, the data is sent and received via the components (e.g., network device, storage device, processing devices) of the implementing computing systems.

The stages may be operated by a single entity (e.g., company) or multiple entities. For example, tokenize stage 104 may be implemented as a stand-alone service by a first entity and a second entity may be responsible for storage of its production and non-production data stores. In other examples, the same entity that provides the tokenization may manage the storage on a behalf of other entities—such as using shared computing infrastructure. Other configurations may be used without departing from the scope of this disclosure.

The computing systems (and components thereof) may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Components of one of the computing systems may issue commands or send/receive data to other computing system via an Application Programming Interface (API). For example, a computer in tokenize stage 104 may connect with a database (e.g., non-production data store 120) via an API. The computer may issue an update command to change all values of X to Y, for example, based on a mapping stored in library table 118.

Extraction stage 102 may be implemented as computer code executing on a processing unit (e.g., one or more cores of a processor, an application specific circuit, a group of processors in a shared computing environment, etc.), in various examples. Extraction stage 102 may be configured as either a push or pull operation. For example, in a push-style configuration data may be sent to tokenize stage 104 without a request from tokenize stage 104. In a pull-style configuration, tokenize stage 104 may request data from extraction stage 102 for tokenization.

Extraction stage 102 may use data organized and stored in a variety of manners. For convenience, the organized collection of data is described herein as the production data store 108. Production data store 108 may store data used by an entity (e.g., user, corporation, etc.) that includes user data. The specific storage layout and model used in production data store 108 may take a number of forms—indeed, production data store 108 may utilize multiple models. Production data store 108 may be, but is not limited to, a relational database (e.g., SQL), non-relational database (NoSQL) a flat file database, object model, document details model, graph database, shared ledger (e.g., blockchain), or a file system hierarchy. Production data store 108 may store data on one or more storage devices (e.g., a hard disk, random access memory (RAM), etc.). The storage devices may be in standalone arrays, part of one or more servers, and may be located in one or more geographic areas.

As indicated previously, production data store 108 may include data that should not be stored on non-production systems for privacy (sometimes referred to as personally identifiable information) or regulatory reasons. Accordingly, in various examples, data extraction rules 110 identify the data to extract from production data store 108 and what obfuscation action to take on the data. Data extraction rules 110 may be stored as a table in a database in various examples.

A rule may be defined according to a number of fields. An example table of possible fields is as follows:

| Fields | Details |
| --- | --- |
| RuleSet | Rule Set defines Rules to be written against each table. Each Rule Set may only one apply to one table in some examples. |
| DataSet | Library Table where data may be stored. This may help define where data will be stored post Obfuscation/tokenization |
| Table Name | Tables name from where data will be pulled |
| Field name | Table field name from where data will be pulled |
| Field Length | Source Field lengths |
| Sequence | To be maintained per Library Table within RuleSet |
| Extract To Staging | Indicates what fields are to be extracted to a staging table |
| Data Subject | Data Subject is used to group various fields (e.g., first name, last name, bank number). |
| Field Description | Short Description of Repository Objects |
| Change Flag | Reflects what to be done with each field value. Possible Values<br>N → Do Nothing<br>C → Change/Carry<br>R → Randomize |
| Anchor Flag | Whether field is Anchor or Not. This may define if a field will govern other fields or not. |
| Staging Table Field | Staging Table field name where data may be stored for further processing |
| Dataset_Fld_From | Source field in Library Table which stores data to be Obfuscated |
| Dataset_Fld_To | Target field in Library Table which stores Obfuscated data |
| Changed_On | Values changed on Date |
| Changed_By | Values changed By (e.g., user or process identification) |

In various examples, data extraction rules 110 may include preconfigured rules to identify PII. The preconfigured rules may extract names (all configurations of name like first name, last name, full name etc.), addresses, date of birth, bank account numbers, Tax IDs, and Medical information. In various examples, a regular expression may be used to find PII of the types listed above.

FIG. 1 illustrates a single staging table, staging table 112; however, multiple stage tables may exist. For example, a staging table may be created for each entity (e.g., an enterprise) that has a need for tokenization. Furthermore, multiple staging tables may exist for a single entity. For example, individual staging tables may be used for different types of data. Accordingly, there may be a staging table that stores addresses that need tokenization and another staging table with social security numbers.

In an example, staging table 112 includes the entries with original data values received from extraction stage 102. Staging table 112 may only include the data values in some examples. In other examples, staging table 112 may include additional columns that indicate a data type, a rule identification indicating what type transformation, if any is required, the originating table name, the originating field name, an entity identifier, etc.

Tokenization component 114 may iterate through the data in staging table 112 and transform the data according to data type rules 116. Data type rules 116 may indicate how different types of data are obfuscated. For example, data type rules 116 may include rules for Address management (valid address tokenized with another valid address), tax jurisdiction compatibility with address, tax ID compatibility to ensure valid tax ID for system validations, bank account number compatibility, valid date including leap year, names (first name, last name and full name compatibility), random number replacement, value replacement using a pick list, special logic for email, copy from another obfuscated field (e.g., store uppercase version), and clearing out data.

Different options may be available for transforming different data types. For example, for names (e.g., last name, first name, full name) a rule may indicate to transform the original value into random characters/blank, names from a stored data subject table, country specific names, or enterprise names. A rule for an address may be random characters or a value, random address. Options to preserve the state and country may be included as well. Options for a date may include a full random date, random date/month but keep the year the same in various examples. Other rules for other types—as well as other options for the identified rules—may be used without departing from the scope of this disclosure.

A data subject table (not illustrated) may include entries of valid values for a given type of data. Accordingly, there may be a first name data subject table, a last name data subject table, a full name data subject table, a social security number table, etc. When a rule indicates that a non-random character first name is needed, the first name data subject table may be queried, for example.

The results of the tokenization (e.g., the transformation) may be stored in library table 118. As with the staging tables, there may be multiple library tables such as one for each entity, one for each type of data, multiple staging tables for a single entity. In various examples, library table 118 includes a "from" column and a "to" column. The "from" column may include the original value and the "to" column may include the changed value (e.g., the output of tokenization component 114). In various examples, library table 118 includes additional columns that identify the source table and source field, etc.

The tokenization provided by tokenization component 114 may be a one-way tokenization. For example, consider that tokenization component 114 tokenizes "Alice" as "George." If a hacker or other nefarious actor saw "George" there would be no way algorithmically to get back to Alice without library table 118. In some examples the one-way tokenization is a hashing algorithm. Similarly, once updated, anyone accessing non-production data store 120 would not know that when "George" is used that the original value was Alice.

After tokenizing, library table 118 may be transmitted to distribution stage 106. Database update rules 122 may execute a series of database update commands to update non-production data store 120 in accordance with library table 118. For example, an SQL query may find instances of Alice and replace them with George. The changes may be made to dependent tables as well. For example, if an address table includes a name column from a name table, the instance of "Alice" in the address table may also be updated to "George."

Furthermore, other storage systems beyond a relational database may be updated. For example, it is common for an organization to have numerous data stores that may or may not be logically linked. If there is a user profile entry for "Alice" in one system that is now changed to "George" based on library table 118, but another system uses "Mary" for "Alice," testing a new process may lead to an error when one should not exist. Accordingly, database update rules 122 may issue commands to update any instance of Alice to George across each data store to ensure consistency.

One of the technical benefits of using a library table is that it allows updating data values across multiple tables in a single pass. For example, consider a simple table with two columns (column 1 and column 2) and a single entry. Both columns have values of "testa." Prior systems may randomly convert "testa" in the first column to one value and the "testa" in the second column to another value. For example, the following SQL commands may be used:

```
UPDATE [DBO].[RANDOMTEST]
SET [COLUMN1] = 'TESTA'
  , [COLUMN2] = 'TESTA'
SELECT * FROM [DBO].[RANDOMTEST]
```

This be acceptable if there is no linkage between the two columns, but is unacceptable when the value in both columns need to remain the same for testing purposes.

If a column is randomly assigned a value, then it may not be possible to get the same random value in an update statement of the two columns with the same value. For example, the following code may result in "testa" in the first column being 6 and the second column being 9.

```
update [dbo].[RandomTest]
SET [Column1] = cast(CAST(1.0 + floor(9 * RAND(convert(varbinary, newid( )))) as varchar) as integer)
  , [Column2] = cast(CAST(1.0 + floor(9 * RAND(convert(varbinary, newid( )))) as varchar) as integer)
select * from [dbo].[RandomTest]
```

One may try assigning Column 2 value to the Column 1 value, but the new random value assigned to Column 1 is not in place until after the update requiring a second pass to be made as the following update statement will not work.

```
update [dbo].[RandomTest]
SET [Column1] = cast(CAST(1.0 + floor(3 * RAND(convert(varbinary, newid( )))) as varchar) as integer)
  , [Column2] = [Column1]
select * from [dbo].[RandomTest]
```

```
-- Column 1 does not have value until after update when trying to set it to
same value
update [dbo].[RandomTest]
SET [Column1] = cast(CAST(1.0 + floor(3 * RAND(convert(varbinary,
newid( )))) as varchar) as integer)
    , [Column2] = [Column1]
select * from [dbo].[RandomTest]
```

The result of the above code may be that the "testa" in column 1 is "1' but "testa" in column 2 remains "testa". Column2 received the original value of Column1 and not the new randomized value. The example shows a simple case of a one record table, but is compounded with a 1 to N number of records in a table.

The use of a library table allows a join operation to be performed that enables a single pass update:

```
update TargetT
SET [Column1] = ISNULL(T1.Random_Column,0)
    , [Column2] = ISNULL(T2.Random_Column,0)
from [dbo].[RandomTest] TargetT
left join xxx.[dbo].librarytable T1 on T1.Orig_Column = [Column1]
left join #temp1 T2 on T2.Orig_Column = [Column2]
```

Figure 2:
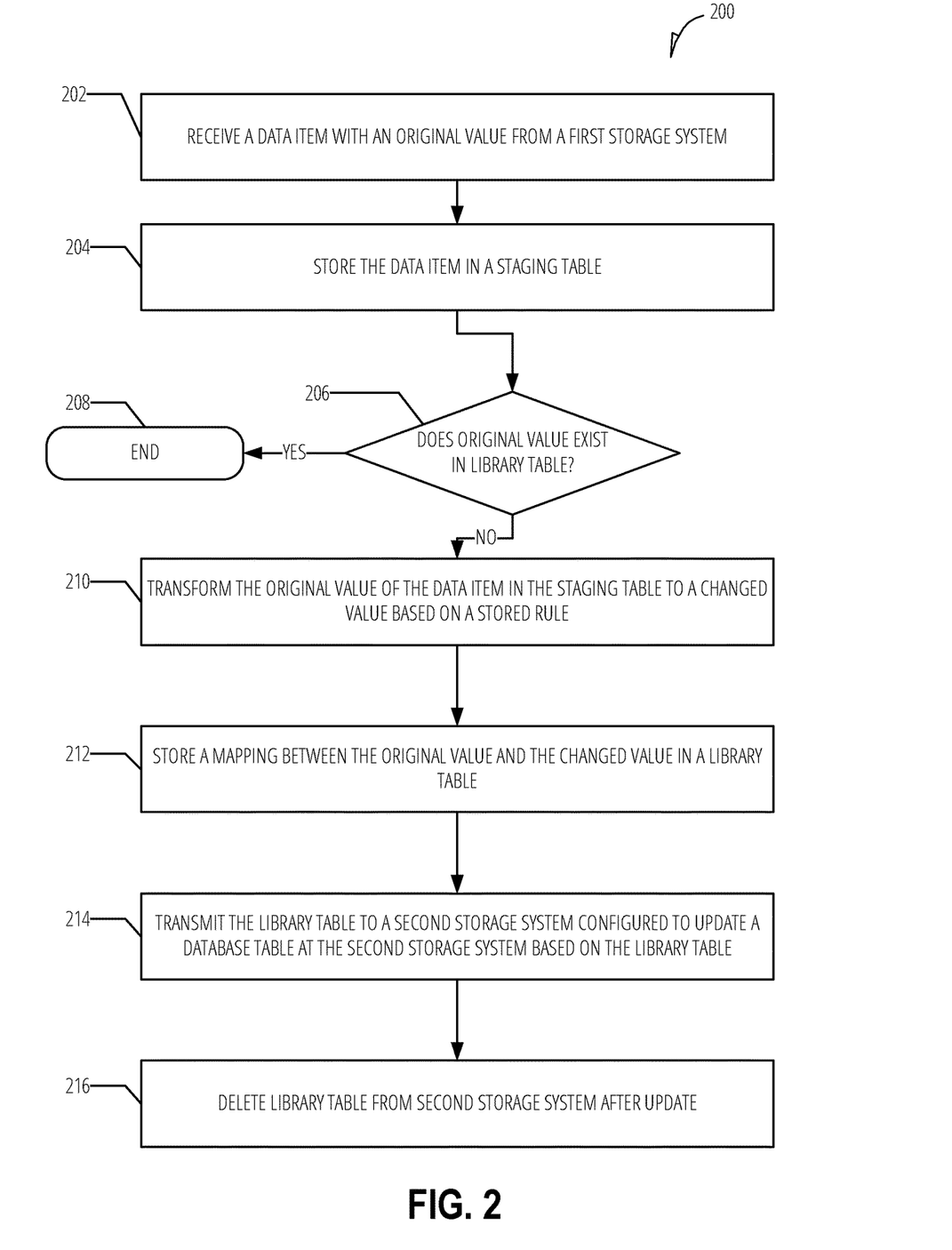
FIG. 2 is a flowchart illustrating a method to tokenize a data item, according to various examples.

FIG. 2 is a flowchart 200 illustrating a method to tokenize a data item (e.g., a value in a database), according to various examples. The method is represented as a set of blocks that describe operations 212-214 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 2. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Figure 3:
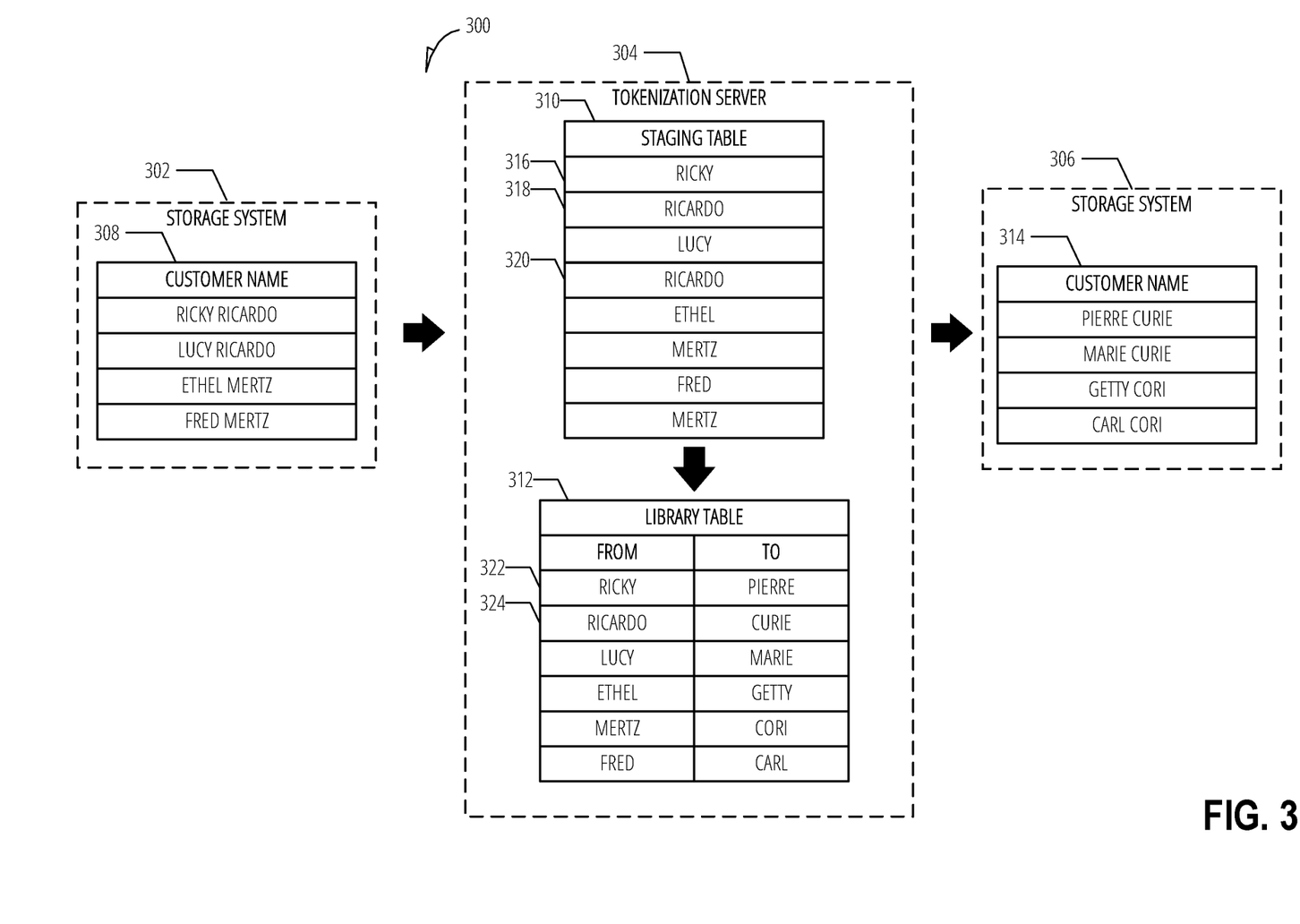
FIG. 3 is a diagram illustrating tables for tokenizing data items, according to various examples.

The operations of FIG. 2 are discussed in conjunction with the tables illustrated in FIG. 3; however, the operations may be performed with different tables. FIG. 3 is a diagram illustrating tables for tokenizing data items, according to various examples. FIG. 3 includes storage systems 302, 306 and tokenization server 304. Storage system 302 may be a production data store such as production data store 108. Storage system 306 may be a non-production (e.g., testing) data store such as non-production data store 120. Tokenization server 304 may perform the functions described with respect to tokenize stage 104. Storage system 302 includes customer name table 308, tokenization server 304 includes staging table 310 and library table 312, and storage system 306 includes customer name table 314. In various examples, the data stored in storage system 302 and tokenization server 304 share a common schema.

Additionally, to maintain the benefit of increased privacy that obfuscation provides, access may be limited to the tokenization server. For example, the engineers and non-employees that are permitted access to the second storage system may be restricted from accessing the tokenization server.

With reference back to FIG. 2, the method may begin at operation 202 in which a data item is received with an original value from a first storage system. At operation 204, the data item is stored in a staging table.

For example, with reference to FIG. 3, tokenization server 304 may receive data items (e.g., values from fields in a database) from customer name table 308. The data items may be all or a subset of the data in storage system 302. (e.g., the first storage system). For example, some of the data may not be PII or subject to other access restrictions and thus does not need tokenization. The data received by tokenization server 304 may be based on rules applied at storage system 302. In some examples, tokenization server 304 may request data from storage system 302 using an API.

As illustrated, the data items are customer names and each name has been broken apart into first (e.g., entry 316) and last names (e.g., entry 318). Accordingly, staging table 310 includes entries for each of the first and last names in customer name table 308. In some examples, only unique entries are stored. For example, entry 318 and entry 320 both have an original value of "Ricardo" in FIG. 3, but entry 320 may be excluded in some examples.

With reference back to FIG. 2, at operation 206, it may be determined whether or not an original value already exists in a library table. For example, if a original value is "Ricky" and the library table already has a mapping from "Ricky" to some other value, the process may end at operation 208. In an example, operations 206-214 (assuming the entry does not exist in the library table) are performed for each entry in a staging table (e.g., staging table 310).

Based on a determinization that the original value is not present in a library table, operation 210 may be performed. At operation 210, the original value of the data item in the staging table is transformed to a changed value based on a stored rule. The store rules may be based on a type of the data being transformed. For example, there may be a rule for names.

The rule may indicate the type of transformation. For example, the rule may indicate that a one-way transformation from the original value to a changed value is to be performed. The one-way transformation may include using a seed value to randomize an entry in various examples. In various examples, the rule may indicate that the changed value is to be randomly selected from a data subject table. The data subject table may be selected based on the type of the original value. For example, there may be a data subject table for names and another data subject table for addresses. In various examples, the rule may indicate that original value and changed value are to be equal length.

At operation 212, the method may include storing a mapping between the original value and the changed value in a library table. For example, entry 322 in library table 312 shows that the original value of "Ricky" has a changed value of "Pierre" and entry 324 shows that the original value of "Ricardo" has a changed value of "Curie."

At operation 214, the method may include transmitting the library table to a second storage system configured to update a database table at the second storage system based on the library table. For example, with reference to FIG. 3, library table 312 may be transmitted to storage system 306 to update customer name table 314. Customer name table 314 is shown with the updated values.

Transmitting the library table to the second storage allow faster updating at the second storage system than if the tokenization server system issued commands directly to the second storage system. For example, the second storage system may be located thousands of miles away from the tokenization server and each command to update a row, etc., of a database at the second storage would need to travel that distance. Accordingly, the transfer of just the library table—and not thousands of update commands—minimizes data transfer and thus increases the overall speed of the updates.

Separating the tokenization system from the second storage system provides speed and resources benefits as well. For example, updating millions of rows and terabytes worth of data is a processing intensive task. To quickly update such a large set of data, parallelization may be used by the second storage system. For example, different groups of servers in the second storage system may be configured to perform the updating from the original values to the changed values. Each group may have a configuration that determines how many parallel tasks are permitted for the group. The number of permitted parallel tasks may be determined based on the number of CPUs and database server size (e.g., using stored logic rules). The number of parallel tasks may be dynamically determined when a request (e.g., update x rows) is received at the group.

Each group may also have a package size value that informs how many rows the group may update per update pass. This value may ensure that there is enough memory for an update request to be processed. If too much memory is allocated, then the process may fail. For example, a group may read a unique (e.g., rows that have not yet been obfuscated) amount of data according to the package size (e.g., rows 1-10,000 of a table to be obfuscated). The group may work through the rows and update them according to values in the library tables. Then, the next 10,000 rows may be retrieved, which are then updated, and so on.

By not requiring the tokenization server to manage the parallelization described above, the tokenization server may remain small from a resource (e.g., CPU power, memory) perspective. This allow the tokenization server to co-exist on system, which would not be possible if the tokenization server also managed the obfuscation process that update the second storage system. For example, by keeping the tokenization server small it may be deployed as a virtual machine on the same system as the first storage system in some examples.

At operation 216, the method may include deleting the library table from the second storage system. If the library table was not deleted, anyone with access to the second storage system would be able to determine the original values. In an example, deleting may include issuing a truncate command on the library table at the second storage system.

In some examples, the first storage system is associated with an identification. The identification may be an entity identification. Different library tables may be used for different entities in some examples. The method may further include an operation of selecting the library table from a plurality of tables based on the identification.

In some example, the library tables may be re-initialized. This may include removing all entries in a library table and rebuilding them as new data comes in (e.g., in a staging table). Thus, the original value of a data item may be transformed to a third value that is different than the changed value. The library table may be updated to store the mapping between the original value and the third value. Re-initialization may also include using new seed values for any randomization transforms, various examples.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
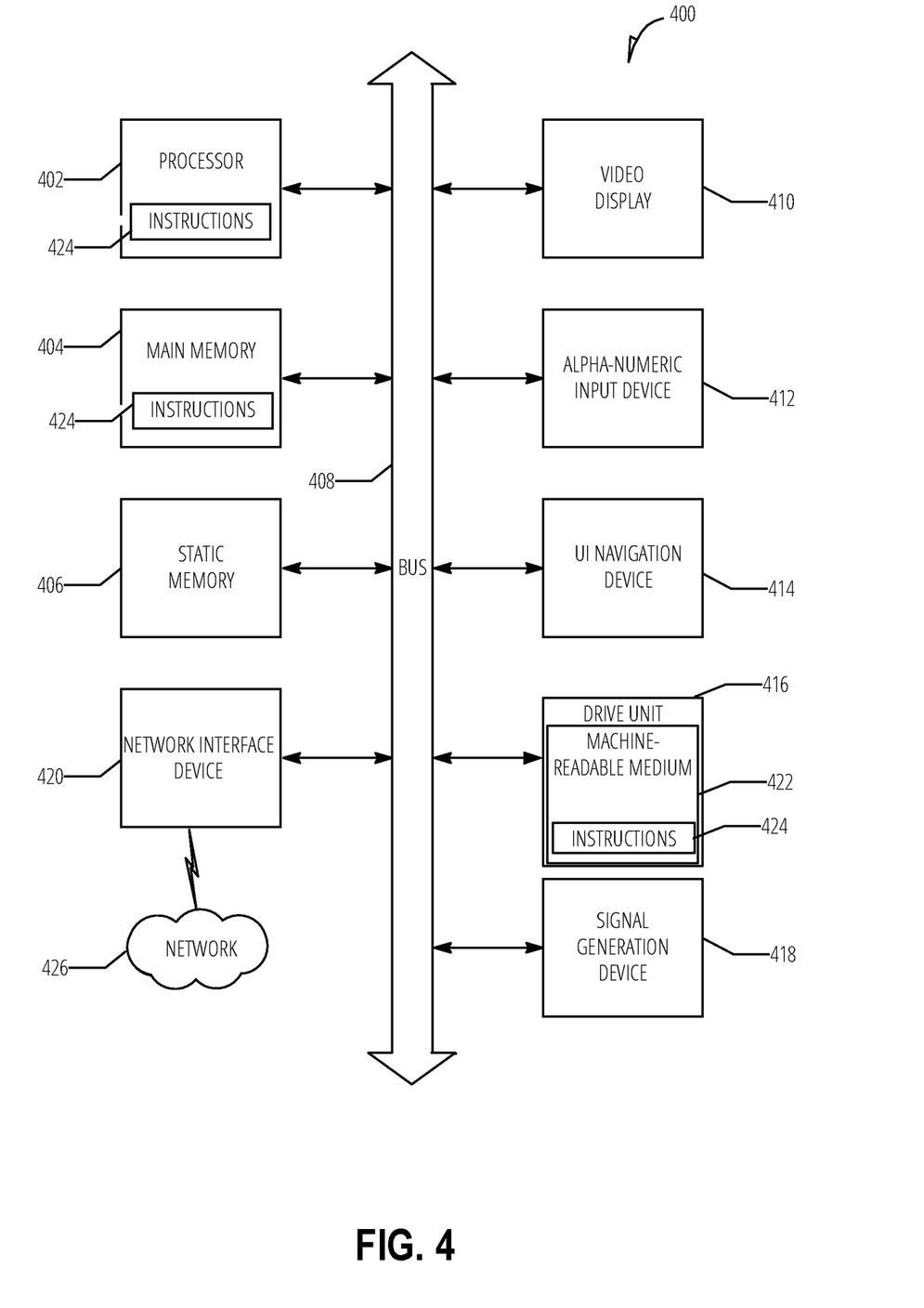
FIG. 4 is a block diagram illustrating an example machine upon which any one or more of the techniques (e.g., methodologies) discussed herein may be performed, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system to tokenize values, the system comprising:
    a processing unit;
    a storage device comprising instructions, which when executed by the processing unit, configure the processing unit to perform operations comprising:
    receiving a data item with an original value from a first storage system;
    storing the data item in a staging table;
    transforming the original value of the data item in the staging table to a changed value based on a stored rule;
    storing a mapping between the original value and the changed value in a library table;
    transmitting the library table to a second storage system;
    receiving a request to re-initialize the library table; and
    based on the request:
        transforming the original value of the data item in the staging table to a third value, and
        storing a mapping between the original value and the third value in the library table.

2. The system of claim 1, wherein transforming the original value of the data item in the staging table to the changed value further comprises performing a one-way transformation from the original value to the changed value.

3. The system of claim 1, wherein transforming the original value of the data item in the staging table further comprises:
    selecting a data subject table based on a type of the original value; and
    randomly selecting a value from the data subject table as the changed value.

4. The system of claim 1, wherein the transforming comprises determining the original value is an address and determining the changed value to maintain a tax jurisdiction compatibility with the original value.

5. The system of claim 1, wherein the transforming comprises determining the original value is an address and determining the changed value to preserve a state or country of the address.

6. The system of claim 1, wherein the transforming comprises determining the original value is a bank account and determining the changed value to be a number compliant with a bank account number compatibility standard.

7. The system of claim 1, wherein the second storage system is accessible to a non-production system to validate a production system the production system having access to the first storage system.

8. A computer-readable storage device comprising instructions, which when executed by a processing unit, configure the processing unit to perform operations comprising:
   receiving a data item with an original value from a first storage system;
   storing the data item in a staging table;
   transforming the original value of the data item in the staging table to a changed value based on a stored rule;
   storing a mapping between the original value and the changed value in a library table;
   transmitting the library table to a second storage system;
   receiving a request to re-initialize the library table; and
   based on the request:
      transforming the original value of the data item in the staging table to a third value, and
      storing a mapping between the original value and the third value in the library table.

9. The storage device of claim 8, wherein transforming the original value of the data item in the staging table further comprises performing a one-way transformation from the original value to the changed value.

10. The storage device of claim 8, wherein transforming the original value of the data item in the staging table further comprises:
   selecting a data subject table based on a type of the original value; and
   randomly selecting a value from the data subject table as the changed value.

11. The storage device of claim 8, wherein the transforming comprises determining the original value is an address and determining the changed value to maintain a tax jurisdiction compatibility with the original value.

12. The storage device of claim 8, wherein the transforming comprises determining the original value is an address and determining the changed value to preserve a state or country of the address.

13. The storage device of claim 8, wherein the transforming comprises determining the original value is a bank account and determining the changed value to be a number compliant with a bank account number compatibility standard.

14. The storage device of claim 8, wherein the second storage system is accessible to a non-production system to validate a production system the production system having access to the first storage system.

15. A method comprising:
   receiving, at a tokenization server, a data item with an original value from a first storage system;
   storing, at the tokenization server, the data item in a staging table;
   transforming, at the tokenization server, the original value of the data item in the staging table to a changed value based on a stored rule;
   storing, at the tokenization server, a mapping between the original value and the changed value in a library table; and
   transmitting, from the tokenization server, the library table to a second storage system receiving a request to re-initialize the library table; and
   based on the request:
      transforming the original value of the data item in the staging table to a third value, and
      storing a mapping between the original value and the third value in the library table.

16. The method of claim 15, wherein transforming the original value of the data item in the staging table to the changed value based on the stored rule includes performing a one-way transformation from the original value to the changed value.

17. The method of claim 15, wherein transforming the original value of the data item in the staging table to the changed value based on the stored rule includes:
   selecting a data subject table based on a type of the original value; and
   randomly selecting a value from the data subject table as the changed value.

18. The method of claim 15, wherein the transforming comprises determining the original value is an address and determining the changed value to preserve a state or country of the address.

19. The method of claim 15, wherein the transforming comprises determining the original value is a bank account and determining the changed value to be a number compliant with a bank account number compatibility standard.

20. The method of claim 15, wherein the second storage system is accessible to a non-production system to validate a production system, the production system having access to the first storage system.

* * * * *